United States Patent [19]
Skidmore

[11] 3,738,409
[45] June 12, 1973

[54] APPARATUS FOR FLASH-CONCENTRATING VISCOUS LIQUIDS

[75] Inventor: Richard H. Skidmore, Strafford, Pa.

[73] Assignee: Welding Engineers, Inc., King of Prussia, Pa.

[22] Filed: Jan. 27, 1971

[21] Appl. No.: 110,160

[52] U.S. Cl. .................................. 159/2 E, 925/203
[51] Int. Cl. .......................... B01d 1/28, A01j 17/00
[58] Field of Search .............. 159/6 W, 6 WH, 2 E; 425/203

[56] References Cited
UNITED STATES PATENTS

| | | | |
|---|---|---|---|
| 2,458,068 | 1/1949 | Fuller.................................. | 100/104 |
| 3,085,288 | 4/1963 | Street.................................. | 259/192 |
| 3,211,209 | 10/1965 | Latinen et al...................... | 159/6 W |
| 3,240,746 | 3/1966 | Davis.............................. | 260/94.7 X |
| 3,376,603 | 4/1968 | Colombo .......................... | 425/203 |
| 3,461,939 | 8/1969 | Fiorelli et al..................... | 159/6 WH |
| 3,535,737 | 10/1970 | Hendry .............................. | 425/203 |
| 3,228,453 | 1/1966 | Ellenberger........................ | 159/6 W |
| 2,836,851 | 6/1958 | Holt .................................... | 159/2 E |
| 3,046,609 | 7/1962 | Bergmeister et al. ................ | 159/2 E |

Primary Examiner—Norman Yudkoff
Assistant Examiner—J. Sofer
Attorney—Paul & Paul

[57] ABSTRACT

A viscous fluid containing a volatile ingredient is subjected to evaporation by heating the liquid and supplying the heated liquid at a metered rate to a pump, which pump includes a housing and a pair of intermeshing screws arranged in close running clearance in the housing. The pump moves the viscous liquid material forwardly while permitting the flashed vapors to proceed through the close running clearance. The vapors are collected and the liquid may be subjected to one or more further cycles.

Gases and vapors are removed from various kinds of plastic materials in extruders through a vent containing a worm running with close working clearance in a housing which is connected into the extruder.

1 Claim, 4 Drawing Figures

INVENTOR.
Richard H. Skidmore

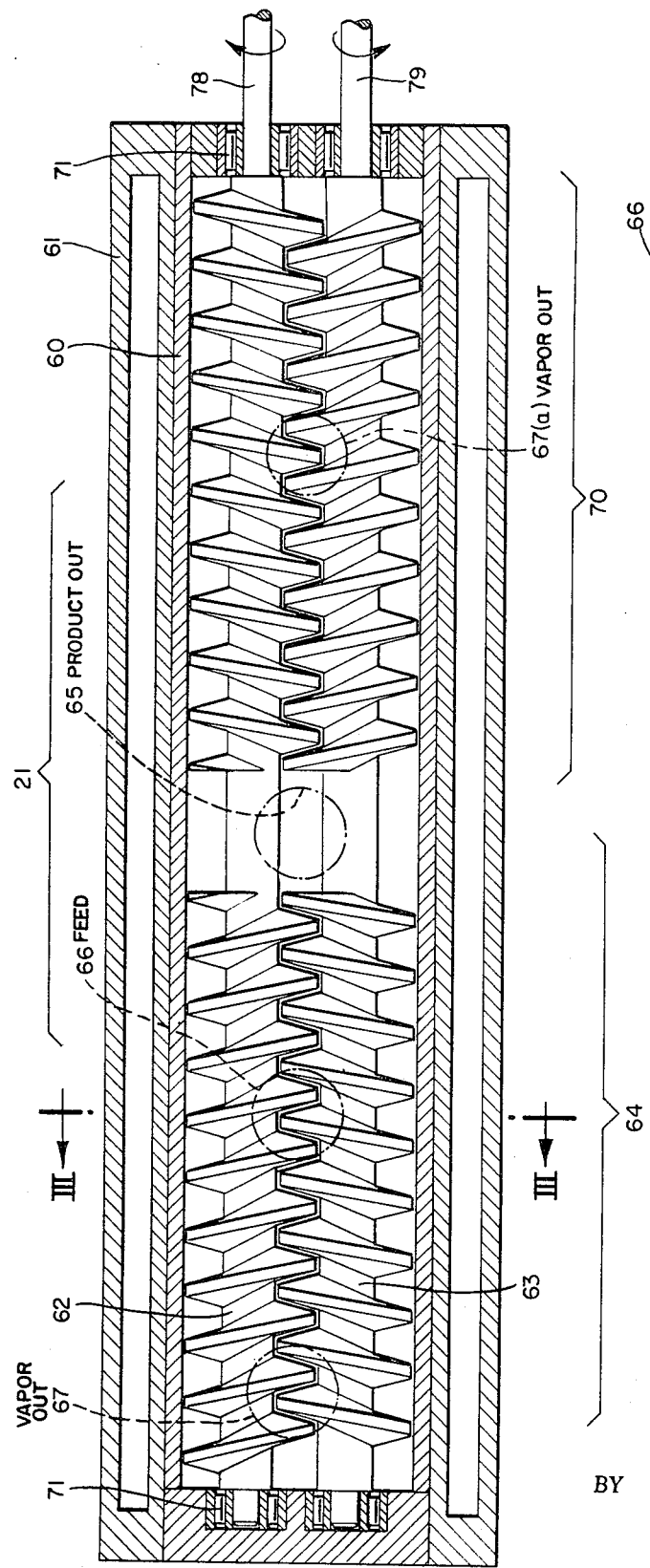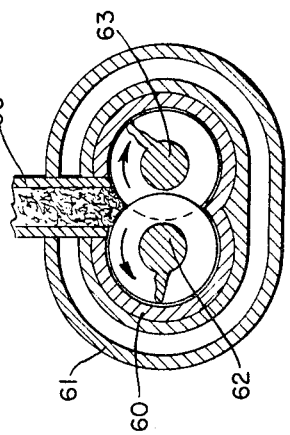

APPARATUS FOR FLASH-CONCENTRATING VISCOUS LIQUIDS

This invention relates to a method for flash-concentrating viscous liquids containing one or more volatile components, and also relates to forwarding apparatus for conveying viscous liquid material while concurrently flashing volatiles from the liquid material. This invention further relates to an apparatus that is particularly suited for removal of vapors from a highly viscous, but still flowable, semi-solid material.

BACKGROUND OF THE INVENTION

In the concentration of solutions, particularly solutions containing small amounts of solids per unit amount of liquid, expensive operations such as solvent vaporization in a stripping tower, or multiple effect evaporation have been conventionally used. It is an object of this invention to provide an apparatus which is much more efficient and less costly and which does not require such large supplies of condensing water, steam, etc. for successful operation.

SUMMARY OF THE INVENTION

An object of this invention is to provide a method which is ideally suited for the handling of fluids including low-solids solutions, plastics and the like, more efficiently and rapidly than conventional evaporation processes, and to provide an apparatus for flashing the vapors from viscous liquids rapidly and under violent conditions, with minimum entrainment of fines in the vapors.

The foregoing and other objects and advantages of this invention will further become apparent hereinafter and in the drawings.

BRIEF DESCRIPTION OF THE DRAWINGS

FIG. 2 is a plan view, with the housing portion broken away and shown in section, of a pump enbodying features of this invention;

FIG. 3 is a sectional view taken as indicated by the lines and arrows III — III which appear in FIG. 2.

DESCRIPTION OF THE PREFERRED EMBODIMENTS

Figure 1:
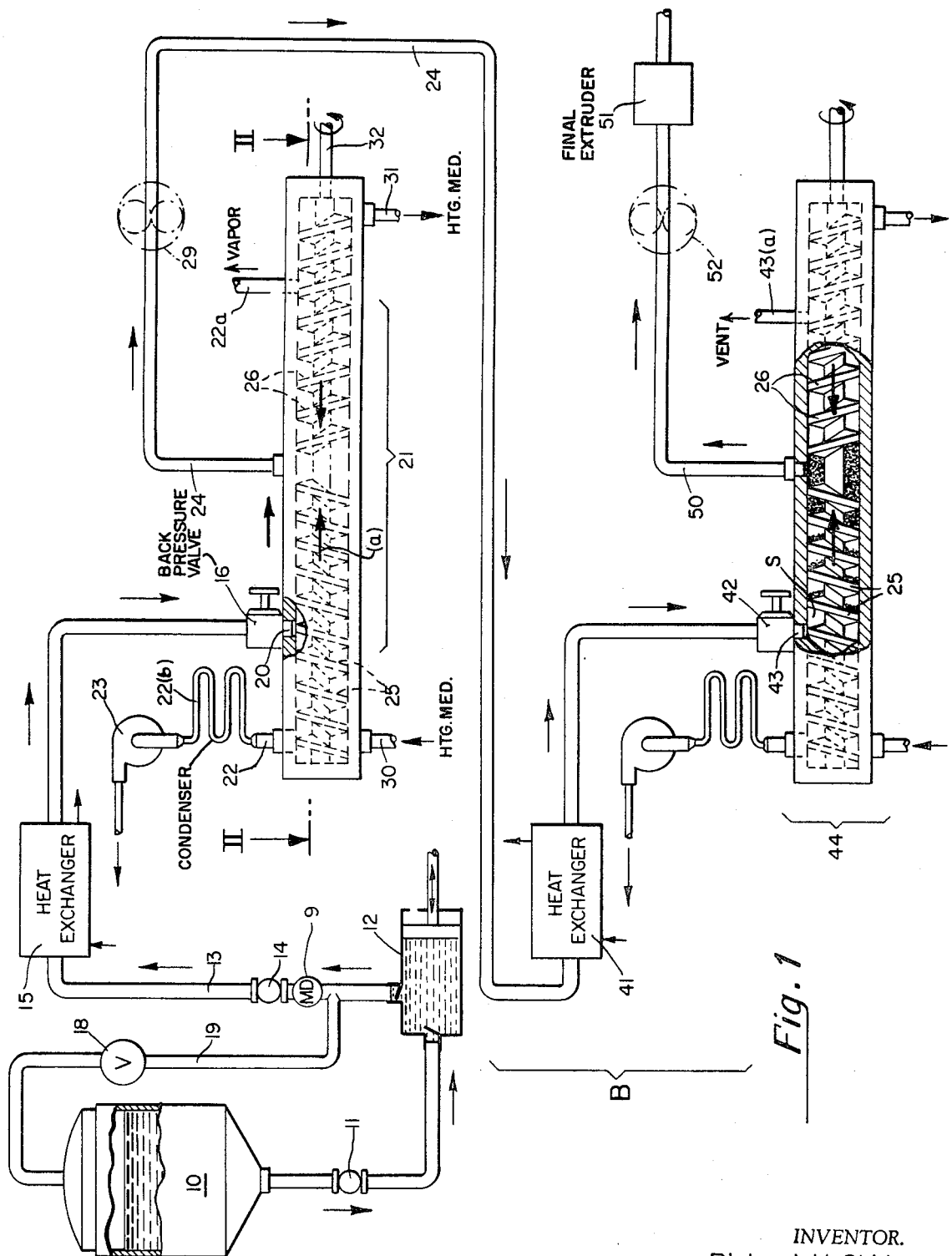
FIG. 1 is a diagrammatic view showing an apparatus constructed in accordance with features of this invention.

Although specific terms will be used in this specification for the sake of clarity, it is to be appreciated that those terms are intended to describe the specific forms of the invention selected for illustration in the drawings and are not intended to limit or to define the scope of the invention.

Referring now specifically to FIG. 1, the number 10 designates a tank containing a viscous solution such as any polymer or plastic, for example, in a volatile solvent. The initial concentration may be of the order of 10 percent – 98 percent by weight solvent, or even more or less, depending solely upon the economics involved. Tank 10 has an outlet valve 11 connected to a positive displacement pump 12 which is diagrammatically illustrated. Pump 12 is preferably a gear pump, for example. Pump 12 is connected through a pipe 13 and through a valve 14 to the inlet of the heat exchanger 15. A metering device (MD) 9 in line 13, is provided to insure a constant rate of flow in the pipe 13. A valve 18 in by-pass line 19 facilitates flow control in line 19.

Heat exchanger 15 is heated (by means not shown) in a manner to conduct heat into the solution which is continuously flowing through the heat exchanger.

The number 16 designates a back pressure regulating valve which is connected into the inlet 20 of a novel screw pump comprehensively designated 21, the details of which will further be disclosed hereinafter. It is preferred that the valve 16 be located adjacent to or very near the pump inlet.

Screw pump 21 has a vapor outlet 22 upstream of the inlet 20, having a condenser 22b. A vapor or condensate pump 23 may be provided if desired to assist in the elimination of vapor and/or condensate. Another vapor outlet 22(a) is provided adjacent to screw flights 26.

Screw pump 21 positively displaces the viscous liquid in the direction indicated by the arrow (a) in FIG. 1, and the product flows outwardly through the outlet pipe 24. It will be noted that the screw pump 21 has forwardly directed flights 25 and, at one end, reversely directed flights 26, and that the flights are interlocked to a similar predetermined clearance.

The screw pump 21 can be externally heated or cooled as desired, and pipes 30, 31 have been shown in order to designate respectively the inlet and outlet for heat exchanging fluid. The number 32 designates a drive shaft of the screw pump in accordance with this invention. The details of the pump and its novel operation will be developed more fully hereinafter.

In some instances, it may be desirable that two or more stages be provided, depending upon the solvent concentration of the initial mixture, and the desired solvent concentration of the product, a second such stage being designated by the letter B. The partially concentrated solution from the pipe 24 is conducted (optionally with the assistance of a gear pump 29), through a heat exchanger 41, and a pressure regulating valve 42 into an inlet 43 of another screw pump 44, the parts of which are similar to those already described in connection with the first stage, and which parts are similarly numbered.

Pump 44 has been shown with the central portion of the housing broken away in order to illustrate a typical configuration of the viscous liquid flowing within the pump. It will be appreciated that a similar configuration is present in the pump 21. The mixture containing volatiles is flashed through the opening 43 and enters usually as a foam into the small open space S immediately below. The material that is not volatilized quickly collects on the forward-facing portions of the screw flights, as shown, and fills the flight interspaces completely in the open area leading to the outlet 50. A vent 73(a) is provided for flashing vapors adjacent to flights 26.

Screw flight and housing clearances of about ten thousandths of an inch, for example, are enough to pass the vapors at a commercially productive rate while entraining the foam or fines with high efficiency. This also provides the advantage of minimum residence time for any polymeric material in the (heated) pump, and minimum polymeric volume in the system, therefore minimum chemical degradation of the polymeric material. However, larger clearances have also been effective as a fines trap. Also, it may be desirable to have large clearances from the inlet 20 to the vapor outlet 22 and close clearances in the remainder of the unit, from the inlet 20 to the outlet 24.

The product from the second stage flows outwardly through a pipe 50 which is optionally connected through a gear pump 52 to a pump or single stage extruder 51 to produce a uniform, continuously flowing highly viscous product.

It will be appreciated, of course, that any number of stages in addition to stage B may be utilized prior to the time that the product is conducted through a final pump or through an extruder such as the extruder 51.

Turning now to FIG. 2, details of construction of the pump 21 will become more fully apparent. The pump 21 has a housing 60 surrounded preferably by a heat exchanger in the form of a jacket 61. Extending longitudinally within the housing 60 are a pair of intermeshed elongated screws 62 and 63 having a positive forwarding section 64 located upstream of the outlet 65. A vapor outlet 67 is provided upstream of the inlet 66. Downstream of the outlet 65 the screws form a reversely pitched section 70, which seals the polymer and allows some vapor to pass, such vapor escaping through vent 67(a). The bearings 71 at the vapor end of the screw shafts are conventional journal bearings as contrasted to thrust bearings since the thrust balancing effect of the reverse screw portion 70 eliminates the requirement for thrust bearings. The bearings may also be externally mounted, relative to the ends of the housing 60, if desired.

It may be desirable to construct the extruder 21 without the reverse flight screw sections illustrated at the right end of FIG. 2. With such a structure it is normally necessary to provide polymer seals at the forward-most end of the forwardly pitched flights, in place of the reverse flights, due to the passage of drive shafts through that end of the housing 60. In such an arrangement, thrust bearings should be provided at the left-most end, in place of bearings 71, with the inlet 66, outlet 65, and vapor outlet 67 being arranged as illustrated in FIG. 2.

The drive shafts 78, 79 extend through bearings 71 and through the corresponding end wall of the housing. There is no pressure problem at this location, because the rearwardly pitched intermeshing flights in flight section 70 cooperate to form a material plug at some location adjacent to the material outlet 65. This material plug, of course, isolates the drive shafts 78, 79 and their associated bearings from any pressure existing within the portions of the housing that are located upstream of the material outlet 65.

If the shafts 78, 79 terminate inside the housing 60 at their left-most end, as viewed in FIG. 2, the arrangement of inlet 66, outlet 65 and vapor outlet 67 can be such as to have the vapor outlet 67 at either end of the housing 60. For example, when vacuum is desired within the housing 60, the vapor outlet 67 could be at the blind end of the housing 60 for providing the particularly novel feature of facilitating the provision of a vacuum seal at an end of the housing free of fines. When the vapor discharge is to be at atmospheric pressure, the inlet 66 and vapor outlet 67 could be at the drive end, because there would then be no sealing problem, due to pressure equilibrium between the inside and outside of the housing 60.

It is important to observe that the respective worm flights are intermeshed to a predetermined desirable tightness. This provides a desired volume at the inlet 66 into which the volatiles are flashed namely, the volume of the working clearance between the intermeshed flights and between the flights and the housing, as appears clearly in FIG. 3. Further, this intermeshing relationship provides enough free space for the very fast passage of released gases and vapors but acts as an entrainment separator for the fines that are liberated during the violent conditions that accompany the flashing of the vapors.

The intermeshing of the worms and their rotations in opposite directions from one another, as indicated by the arrows in FIGS. 2 and 3, provide a substantially positive interlocking and forwarding action on the viscous liquid or plastic wherein the peripheries of the screws cooperate with the internal shape of the housing 60 to provide a positive forwarding of the material from the inlet 66 to the outlet 65.

It will be apparent that various other embodiments may be utilized instead of the specific embodiment employing twin screws as illustrated in FIG. 2. For example, any elongated member can be substituted for the form of the invention specifically shown in FIG. 2, provided it has a shape cooperating with the shape of the housing which, when rotated, utilizes forwardly inclined surfaces in such a manner as to provide a positive forwarding of the material, and provided its clearances are so close as to function as an entrainment separator to trap solid fines and conduct them along with the main stream of product. In any such embodiment, the provision of one or more reversely inclined flights, in a manner to compensate for the thrust load of the pump, may be utilized. In any such embodiment, the viscous liquid flows from one point along the elongated screw to another point along the elongated screw.

The mixture may be reduced to its final commercial volatile level in the concentrator 44, or it may be carried to additional equipment, such as the final extruder 51, or the like.

It will be appreciated that the "final" extruder 51 may be a worm-type devolatilizing extruder, if desired.

The apparatus of this invention applies not only to polymer-monomer systems or polymer-solvent systems, but to any system utilizing a flowable medium containing a volatile component. For example, rubber crumb in a water medium may be processed according to this invention, with the apparatus preferably running starved. The water flashes off as steam or is squeezed out as a liquid and rubber fines, normally a troublesome problem, do not blow back with the steam but are entrained on the intermeshing screw flights and forwarded along with the main product steam. Vacuum pumps may be used on the vapor outlet, which is a great advantage because they have heretofore encountered serious plugging and fouling problems due to the presence of significant quantities of rubber fines in the vapor.

It will be appreciated that the term "viscous liquid" is intended to mean any material for which a concentration process may be desirable, for example, but not being limited to plastics or rubber, which can be caused to undergo viscous flow under either increased heat or pressure.

It will further be appreciated that many other variations may be made without departing from the spirit or scope of this invention. For example, double or multiple flights may be substituted for the single flights shown in the drawings, equivalent elements may be substituted for other features specifically shown and described, parts may be reversed, and certain features of this invention may be utilized independently of other features, all without departing from the spirit and scope of this invention as defined in the appended claims.

Figure 4:
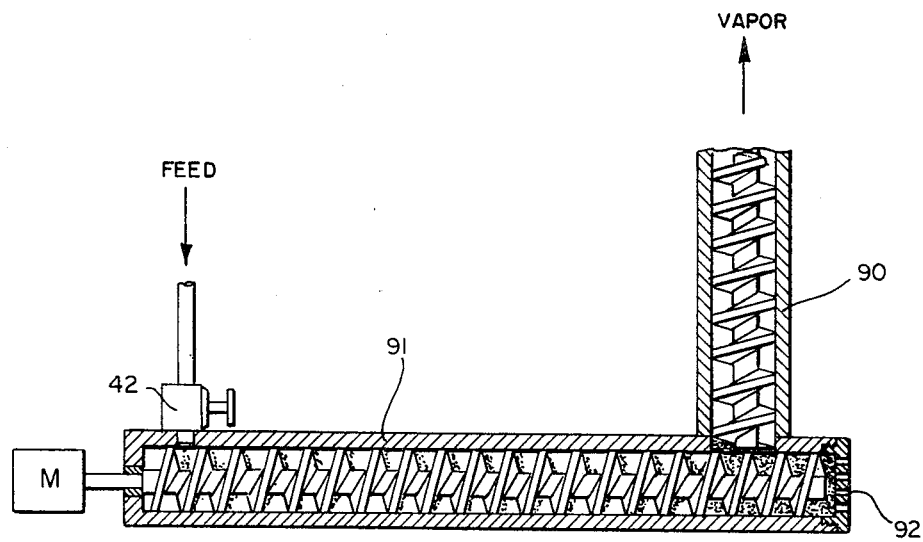
FIG. 4 is a sectional view of an alternative embodiment of apparatus according to this invention.

In one such alternative embodiment, as shown in FIG. 4, the flash concentrating viscous liquid pump 90 of the present invention is vertically mounted atop a horizontally disposed extruder 91 of the type disclosed in Fuller Reissue Pat. No. 23,948 and Skidmore Pat. No. 3,082,816. Viscous solution fed to the extruder flashes off a substantial part of its entrained solvent in that part of the extruder in communication with the outlet of the concentrating pump 90 while the screw of the pump 90 contains the viscous material in a small area immediately adjacent the vent outlet in the extruder 91 and entrains fines carried in the escaping vapor at that location. Subsequently, the concentrated viscous liquid or plastic material passes through orifice plate 92 or, if desired, to a further part of the extruder where it is further worked and devolatilized.

Similarly, any non-miscible liquid contained in a polymer may be squeezed out, with fines similarly entrained, utilizing an entrainment pump such as the extruder 90 of FIG. 4. The pressurized plastic material in the main extruder 91 does not enter into the inter-flight spaces of the entrainment extruder 90 to any appreciable extent.

It will be further understood that the "Abstract of the Disclosure" set forth above is intended to provide a non-legal technical statement of the contents of the disclosure in compliance with the Rules of Practice of the U.S. Patent Office, and is not intended to limit the scope of the invention described and claimed herein.

The following is claimed:

1. In an apparatus for separating a volatile component from a viscous plastic material comprising a main housing, a rectilinear worm rotatable coaxially with close working clearance within said main housing, means for feeding said material and component into the inter-flight spaces of said worm, discharge means for the material near an end of the worm substantially downstream of said means for feeding, means for rotating said worm to work and advance said material and said component along and within said main housing, an entrainment return extruder separate from any said feeding means, said rotating means and said discharge means, being located at a point along said worm from said feeding means and located in the vicinity of said discharge means and discharging returned entrainments directly into the interflight spaces of said worm through a vent opening, said return extruder having its axis arranged at an angle to the axis of said worm and main housing, and itself having a housing with a worm coaxially rotatable therein, said return extruder permitting venting of vapors coaxially of the return extruder and countercurrently relative to the direction of entrained material returned to the worm.

* * * * *